US011622259B2

(12) United States Patent
Roy et al.

(10) Patent No.: US 11,622,259 B2
(45) Date of Patent: Apr. 4, 2023

(54) RSP PLATFORM SELECTION FOR PROVIDING ESIM PROFILES TO USER DEVICES

(71) Applicant: T-Mobile USA, Inc., Bellevue, WA (US)

(72) Inventors: Tanmay Roy, Redmond, WA (US); Cristian Asandului, Snoqualmie, WA (US); Kyeong Hun An, Sammamish, WA (US); Phani Ramisetty, Sammamish, WA (US); Mathew George, Krikland, WA (US); Ryan King, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 168 days.

(21) Appl. No.: 17/243,556

(22) Filed: Apr. 28, 2021

(65) Prior Publication Data

US 2021/0250751 A1    Aug. 12, 2021

Related U.S. Application Data

(62) Division of application No. 16/571,020, filed on Sep. 13, 2019, now Pat. No. 11,026,081.

(51) Int. Cl.
*H04W 4/50* (2018.01)
*H04W 8/18* (2009.01)
(Continued)

(52) U.S. Cl.
CPC ........... *H04W 8/183* (2013.01); *H04W 4/021* (2013.01); *H04W 4/50* (2018.02); *H04W 8/205* (2013.01); *H04W 12/06* (2013.01)

(58) Field of Classification Search
CPC ....... H04W 8/183; H04W 4/50; H04W 4/021; H04W 8/205; H04W 12/06
See application file for complete search history.

(56) References Cited

U.S. PATENT DOCUMENTS 10,187,784 B1   1/2019   Chen et al.
10,194,313 B1   1/2019   Karimli et al.
(Continued)

FOREIGN PATENT DOCUMENTS

WO    2019015793 A1    1/2019

OTHER PUBLICATIONS

U.S. Appl. No. 16/571,010, Corrected Notice of Allowability dated Dec. 30, 2020, 14 pages.
(Continued)

*Primary Examiner* — Dai Phuong
(74) *Attorney, Agent, or Firm* — Han Santos, PLLC

(57) ABSTRACT

Telecommunication services are received at a user device using an embedded subscriber identity module (eSIM) profile stored on the user device while the user device is located in a first geographical area. A list of preferred remote SIM provisioning (RSP) platforms that provide eSIM profiles specific to a partner MNO of the MNO in a second geographical area is also received from an eSIM management platform of an MNO; The user device is then determined to have moved to a second geographical area based on a geolocation of the user device. Subsequently, an additional eSIM profile specific to the partner MNO of the MNO is downloaded to the user device from an RSP platform of one or more RSP platforms included in the list of preferred RSP platforms.

20 Claims, 6 Drawing Sheets

(51) Int. Cl.
*H04W 4/021* (2018.01)
*H04W 12/06* (2021.01)
*H04W 8/20* (2009.01)

(56) References Cited

U.S. PATENT DOCUMENTS

| | | | |
|---|---|---|---|
| 10,813,042 B1* | 10/2020 | Gundavelli | H04W 8/205 |
| 11,516,650 B2* | 11/2022 | Chaugule | H04W 8/205 |
| 2015/0349825 A1 | 12/2015 | Lee et al. | |
| 2015/0359026 A1* | 12/2015 | Iwai | H04W 8/183 |
| | | | 370/329 |
| 2016/0183081 A1 | 6/2016 | Cuadrado et al. | |
| 2016/0269891 A1 | 9/2016 | Chen et al. | |
| 2017/0156051 A1 | 6/2017 | Park et al. | |
| 2017/0164184 A1 | 6/2017 | Borse | |
| 2017/0289788 A1 | 10/2017 | Lalwaney | |
| 2018/0294949 A1 | 10/2018 | Yang | |
| 2018/0295500 A1* | 10/2018 | Yang | H04W 60/00 |
| 2018/0376325 A1 | 12/2018 | Xu et al. | |
| 2019/0037335 A1 | 1/2019 | Steck | |
| 2019/0053185 A1 | 2/2019 | Shah | |
| 2019/0140837 A1 | 5/2019 | Cheng et al. | |
| 2019/0349751 A1 | 11/2019 | Park et al. | |
| 2020/0050439 A1* | 2/2020 | Bjørdal | H04W 8/183 |
| 2020/0178070 A1 | 6/2020 | Yang et al. | |
| 2020/0228969 A1 | 7/2020 | Shin et al. | |
| 2020/0260354 A1 | 8/2020 | Ma et al. | |
| 2020/0359212 A1* | 11/2020 | Chen | H04L 9/3271 |
| 2020/0382910 A1 | 12/2020 | Poer et al. | |
| 2020/0382956 A9 | 12/2020 | Yu et al. | |

OTHER PUBLICATIONS

U.S. Appl. No. 16/571,010, Notice of Allowance dated Nov. 18, 2020, 23 pages.
U.S. Appl. No. 16/571,020, Notice of Allowance dated Feb. 10, 2021, 28 pages.
U.S. Appl. No. 16/571,020, Office Action dated Aug. 27, 2020, 24 pages.
U.S. Appl. No. 16/571,020, Restriction Requirement dated Jun. 4, 2020, 7 pages.

* cited by examiner

RSP PLATFORM SELECTION FOR PROVIDING ESIM PROFILES TO USER DEVICES

CROSS REFERENCE TO RELATED PATENT APPLICATION

This patent application is a divisional application of U.S. patent application Ser. No. 16/571,020, filed on Sep. 13, 2019, entitled "RSP Platform Selection for eSIM Profile Procurement," which is hereby incorporated by reference in its entirety.

BACKGROUND

The use of Embedded Universal Integrated Circuit Cards (eUICCs), also referred to as Embedded Subscriber Identity Modules (eSIMs), is becoming increasingly prevalent in consumer and machine-to-machine (M2M) communication fields. Unlike a traditional UICC or SIM card that exists as a removable smart card that is transferrable between multiple devices, an eUICC is an integrated circuit that is not designed to be user removable, i.e., it is generally embedded with or soldered to other electronic components of a device. An eUICC may be provisioned with one or more eSIM profiles, in which each eSIM profile contains a unique international mobile subscriber identity (IMSI) number that authenticates a subscriber to a mobile network operator (MNO). Other data that are stored in the eSIM profile may include carrier network information, security authentication information, a list of accessible network services, and/or so forth. The MNO may transfer an eSIM profile to the eUICC of a user device via an over-the-air (OTA) update. For example, the user device may be a consumer. Consumer devices are network-capable devices that are generally marketed to individual consumers. For example, these devices may include a smartphone, a tablet computer, a smartwatch, a gaming console, and/or so forth.

MNOs generally use Remote SIM provisioning (RSP) platforms that are operated by third parties to provision the eSIM profiles to the eUICCs of user devices. In many instances, an RSP platform may be provided by an eSIM profile vendor that operates a GSM Association (GSMA)-certified data center. For example, the eSIM profile vendor may be an eUICC manufacturer (EUM), and thus is able to generate eSIM profiles for installation in the eUICCs.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
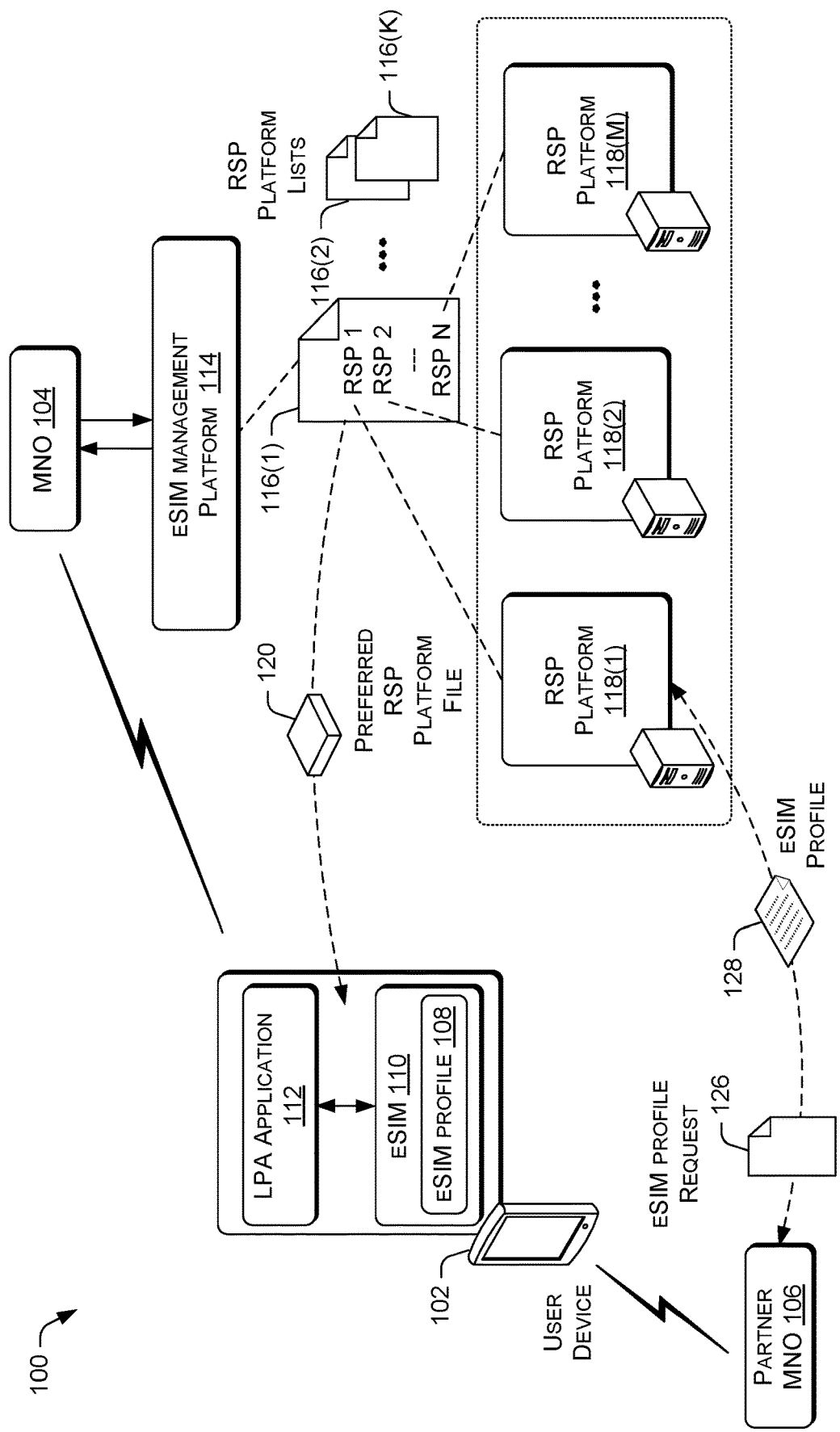
FIG. 1 illustrates an example architecture that enables a Local Profile Assistant (LPA) application on a user device to selectively download a new eSIM profile from a particular RSP platform based on a RSP platform list provided by an eSIM management platform.

This disclosure is directed to techniques that enable a Local Profile Assistant (LPA) application on a user device to download a new eSIM profile from a particular RSP platform when the user device moves from a current geographical area into a new geographical area. The user device may be a subscriber device of an MNO that is using a current eSIM profile stored in the eSIM of the user device to receive telecommunication services from a wireless carrier network of the MNO while in the current geographical area. Following the download of the new eSIM profile from the particular RSP platform to the eSIM of the user device by the LPA application, the LPA application may deactivate the current eSIM profile stored in the eSIM of the user device and activate the new eSIM profile once the user device moves into a new geographical area. The new eSIM profile as activated may enable the user device to obtain telecommunication services from a wireless carrier network operated by a partner MNO of the MNO while in the new geographical area. In this way, the user device may use the wireless carrier network of the partner MNO without having to roam on the wireless carrier network of the partner MNO. The lack of roaming may result in the elimination of roaming charge and/or implementation of discounted billing to a subscriber account of a subscriber that is paying for the telecommunication service usage of the user device.

In various embodiments, an eSIM management platform of the MNO may provide multiple lists of RSP platforms that correspond to different geographical areas for download to the user device. The eSIM management platform may provide new lists of RSP platforms as well as updated lists of RSP platforms. In some embodiments, the eSIM management platform may distribute the multiple lists of RSP platforms via a push-model in which the eSIM management platform automatically sends the lists of RSP platforms to the LPA application of the user device on a periodic basis or on the occurrence of certain events (e.g., user device registering with the wireless carrier network of the MNO, user device approaching within a predefined distance of a geographical area boundary). In other embodiments, the eSIM management platform may distribute the multiple lists of RSP platforms via a pull-model, in which the LPA application of the user device may request the lists of RSP platforms on a periodic basis or on the occurrence of certain events (e.g., user device powering on, rebooting, etc.).

Each list for a particular geographical area may include one or multiple RSP platforms that have been selected by the MNO to provide an eSIM profile of a partner MNO of the MNO. In instances in which a list contains multiple RSP platforms, the multiple RSP platforms may be listed in the list according to an order of preference. In this way, the LPA application of the user device may obtain an eSIM profile of a partner MNO from a most preferred RSP platform. However, in the event the LPA application is unable to obtain the eSIM profile from the first RSP platform, the LPA application of the user device may attempt to obtain the eSIM profile from a next most preferred RSP platform in the list. Accordingly, the LPA application may proceed down the list in the event of one or more additional eSIM profile download failures until the LPA application is able to obtain the eSIM profile from an RSP platform on the list.

In some embodiments, the eSIM management platform of the MNO may analyze the service features of various candidate RSP platforms to determine whether each RSP platform is to be included in a list of RSP platforms. The service features of an RSP platform may include a geographical area serviced by the RSP platform, an availability of the RSP platform to distribute eSIM profiles, a representative (e.g., average) response time of the RSP platform to requests for eSIM profiles, a reliability of the RSP platform in distributing eSIM profiles, available inventory quantities of eSIM profiles for different user device types that are carried by the RSP platform, and/or so forth. In this way, the MNO may maintain control not only over the selection of specific RSP platforms that are to supply eSIM profiles, but also the quality of service provided by the RSP platforms.

The distribution of lists of available RSP platforms for different geographical areas to a user device enables the LPA application on the user device to directly request an eSIM profile from an RSP platform as the user device travels to a new geographical area. The use of an eSIM profile for a partner MNO in the new geographical area may allow the user device to avoid accruing out-of-network roaming fees for using the telecommunication services provided by the partner MNO. In some instances, the use of such an eSIM profile by the user device may also enable the user device to receive higher quality services and/or additional service features from the partner MNO. The techniques described herein may be implemented in a number of ways. Example implementations are provided below with reference to the following FIGS. 1-6.

Example Architecture

FIG. 1 illustrates an example architecture 100 that enables a Local Profile Assistant (LPA) application on a user device to selectively download a new eSIM profile from a particular RSP platform based on an RSP platform list provided by an eSIM management platform. the user device 102 may be a consumer device. Consumer devices are network-capable devices that are generally marketed to individual consumers. For example, these devices may include a smartphone, a tablet computer, a smartwatch, a gaming console, and/or so forth. The user device 102 may be capable of obtaining telecommunication and/or data communication services from the mobile network operator (MNO) 104. The MNO 104 may provide a wide range of mobile communication services, as well as ancillary services and features, to subscribers and associated mobile device users. In various embodiments, the MNO 104 may operate a wireless carrier network that serves multiple user devices. The wireless carrier network may also relay communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network of the MNO 104 may be implemented using multiple interconnected networks. In various embodiments, the wireless carrier network may include multiple Radio Access Networks (RANs). The RANs may be connected to each other via regional ground networks. In turn, the regional ground networks may be connected to a core network by a wide area network (WAN). Each regional portion of the MNO 104 may include one or more RANs and a regional circuit and/or packet-switched network and associated signaling network facilities. The MNO 104 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the MNO 104 may be accessed via wired or wireless local area networks (LANs). For example, a wireless local area network may be a network that is established using Wi-Fi or Bluetooth standards and hardware. In various embodiments, the MNO 104 provides a home wireless carrier network to the user device 102. For example, the user device 102 may be registered with the MNO 104, and the wireless carrier network of the MNO 104 is the default provider of telecommunication services to the user device 102.

However, the user device 102 may from time to time obtain telecommunication service from other wireless carrier networks that are partner MNOs of the MNO 104, such as a partner MNO 106. The partner MNOs generally operate wireless carrier networks in geographical areas that are not served by the MNO 104. For example, the wireless carrier network provided by the MNO 104 may lack telecommunication network coverage in a particular geographical area. As a result, the MNO 104 may have one or more partner MNOs that do provide telecommunication network coverage in the particular geographical area. For example, the MNO 104 may operate a U.S. wireless carrier network, and a partner MNO of the MNO 104 may operate a European wireless carrier network. Nevertheless, in some instances, the MNO 104 and the partner MNOs may operate wireless carrier networks that have overlapping telecommunication network coverage.

The user device 102 may use an eSIM profile 108 that is stored in an embedded Subscriber Identity Module (eSIM) 110 of the user device 102 to authenticate to the MNO 104 in order to obtain telecommunication services from the MNO 104. For example, the eSIM profile 108 may contain a unique international mobile subscriber identity (IMSI) number that authenticates the user device 102 to the MNO 104. Other data that are stored in the eSIM profile may include carrier network information, security authentication information, a list of accessible network services, and/or so forth, that are specific to the MNO 104. An eSIM profile that enables a user device to access a wireless carrier network of a particular MNO as a home wireless carrier network is referred to as an MNO-specific eSIM profile of that particular MNO. Accordingly, the eSIM profile 108 is an MNO-specific eSIM profile of the MNO 104. Nevertheless, in most instances, the eSIM profile 108 is also configured to enable the user device 102 to roam on the wireless carrier networks of the partner MNOs.

In some embodiments, a local profile assistant (LPA) application 112 on the user device 102 may be configured to download a particular eSIM profile associated with a partner MNO, such as the partner MNO 106. In such embodiments, the download of the eSIM profile may occur when the user device 102 moves to a geographical area that is served by the wireless carrier network of the partner MNO and unserved by the wireless carrier network of the MNO 104. Accordingly, the particular eSIM profile may enable the user device 102 to obtain optimal network performance from the wireless carrier network provided by the partner MNO. In some instances, the use of the particular eSIM profile by the user device 102 may also enable a subscriber associated with the user device 102 to pay a discounted rate for the telecommunication services provided by the partner MNO. For example, the discounted rate may be less than a roaming rate that would be otherwise paid by the subscriber for having the user device 102 roam on the wireless carrier network of the partner MNO via the eSIM profile 108.

The user device 102 may download eSIM profiles associated with various MNOs from multiple RSP platforms. For example, an RSP platform may send one or more data packets that contain an eSIM profile to a modem of the user device 102 via an over-the-air (OTA) update. The data packets are assembled by the software of the modem into the eSIM profile and loaded into the eSIM 110 of the user device 102. In various embodiments, each of the multiple RSP platforms may be responsible for the management of eSIM profiles that are specific to one or more MNOs. Accordingly, each of the RSP platforms may include one or more subscription managers that are executed by one or more computing devices. In some embodiments, each of the RSP platforms may include at least one Subscription Manager Data Preparation (SM-DP), at least one Subscription Manager Data Preparation Plus (SM-DP+), and at least one Subscription Manager Secure Routing (SM-SR).

In various embodiments, the eSIM profiles for user devices, such as the user device 102, may be initially loaded into profile state stores of an SM-DP+ operated by an RSP platform. In some instances, each profile data store of the SM-DP+ may hold consumer eSIM profiles of a single MNO. In other instance, a single profile data store of an SM-DP+ may hold eSIM profiles of multiple different MNOs. Accordingly, each SM-DP+ is responsible for managing the eSIM profiles of a different MNO, or multiple SM-DP+s can collectively manage eSIM profiles of a single MNO. Thus, the SM-DP+s may distribute eSIM profiles to the user devices in response to requests from the user devices.

The backend servers of the MNO 104 may provide an eSIM management platform 114. The eSIM management platform 114 may serve as an interface between an operational function of the MNO 104 (e.g., operation support system (OSS), business support system (BSS), and/or so forth), multiple RSP platforms, and/or user devices. Accordingly, the eSIM management platform 114 enables the MNO 104 to manage eSIM profiles for deployment into eSIMs of user devices.

In various embodiments, the eSIM management platform 114 of the MNO 104 may provide multiple lists of RSP platforms, such as the preferred RSP platform lists 116(1)-116(K), which correspond to different geographical areas to the user device 102. Each of the lists may identify one or more preferred RSP platforms that are selected by the MNO 104 to distribute eSIM profiles in a corresponding geographical area. The one or more RSP platforms in a list for a geographical area may be authorized to distribute eSIM profiles that are specific to a particular MNO. An eSIM profile is specific to a particular MNO when the eSIM profile designates a wireless network of the particular MNO as a home wireless carrier network. For example, the list 116(1) may identify the RSP platforms 118(1)-118(M) as selected by the MNO 104 to distribute eSIM profiles in a specific geographical area. In some instances, the eSIM profiles distributed by the RSP platforms 118(1)-118(M) may be specific to the MNO 104. In other instances, the eSIM profiles distributed by the RSP platforms 118(1)-118(M) may be specific to a partner MNO of the MNO 104, such as the partner MNO 106. The eSIM management platform 114 may send one or more of lists of the RSP platforms as a preferred RSP platform file, such as the preferred RSP platform file 120, to the user device 102. Each list of the RSP platforms may be a new list or an update to an existing list already stored in the user device 102. Each list of RSP platforms for a corresponding geographical area may be organized in an order of preference, e.g., from a most preferred RSP platform to a least preferred RSP platform. For example, the preferred RSP platform list 116(1) may indicate that the RSP platform 118(1) is the most preferred, the RSP platform 118(2) is the next most preferred, and the RSP platform 118(M) is the least preferred.

The eSIM management platform 114 of the MNO 104 may analyze service features of various candidate RSP platforms to determine whether each of the various candidate RSP platforms is to be included in a list of RSP platforms. The service features of an RSP platform may include a geographical area serviced by the RSP platform, an availability of the RSP platform to distribute eSIM profiles, a representative (e.g., average) response time of the RSP platform to requests for eSIM profiles, a reliability of the RSP platform in distributing eSIM profiles, available inventory quantities of eSIM profiles for different user device types that are carried by the RSP platform, and/or so forth.

In various embodiments, an eSIM management platform 114 may distribute the preferred RSP platform file 120 to the user device 102 via a pull-model or a push-model. In the pull-model, the LPA application 112 is configured to request an updated version of the preferred RSP platform file 120 from the eSIM management platform 114 for storage in the eSIM 110 on a periodic basis or on the occurrence of certain events (e.g., user device powering on, rebooting, etc.). In the push-model, the eSIM management platform 114 may send the most updated version of the preferred RSP platform file 120 to the LPA application 112 periodically or on the occurrence of certain events (e.g., user device registering with the wireless carrier network of the MNO, user device approaching within a predefined distance of a geographical area boundary). In turn, the LPA application 112 may store the most updated version in the eSIM 110. Each list of preferred RSP platforms for a corresponding geographical area may be organized in an order of preference, e.g., from a most preferred RSP platform to a least preferred RSP platform.

In operation, the user device 102 may initially access telecommunication services from the MNO 104 using the eSIM profile 108 that is specific to the MNO 104 while the user device 102 is located in a first geographical area. Subsequently, the LPA application 112 may detect that the user device 102 has moved to a second geographical area. The second geographical area may be an area that is not covered by the wireless carrier network of the MNO 104, but which is covered by the wireless carrier network of the partner MNO 106.

Following such detection, the LPA application 112 may retrieve a particular list of preferred RSP platforms that corresponds to the second geographical area from the preferred RSP platform file 120 stored in the eSIM 110. Subsequently, the LPA application 112 may download an eSIM profile from the most preferred RSP platform on the particular list. For example, if the RSP platform 118(1) is the most preferred RSP platform, the LPA application 112 may send an eSIM profile request 126 to the RSP platform 118(1). In response, the RSP platform 118(1) may send an eSIM profile 128 that is specific for the partner MNO 106 to the user device 102 for storage in the eSIM 110. The eSIM profile 128 is then used by the user device 102 to access telecommunication services from the partner MNO 106 while the user device 102 is in the second geographical area.

However, in the event the LPA application 112 is unable to obtain the eSIM profile from the first RSP platform, the LPA application 112 may attempt to obtain the eSIM profile from a next most preferred RSP platform on the particular list. Accordingly, the LPA application 112 may proceed down the list in the event of one or more additional failures until the LPA application 112 is able to obtain the eSIM profile from an RSP platform on the list.

Example eSIM Management Platform

Figure 2:
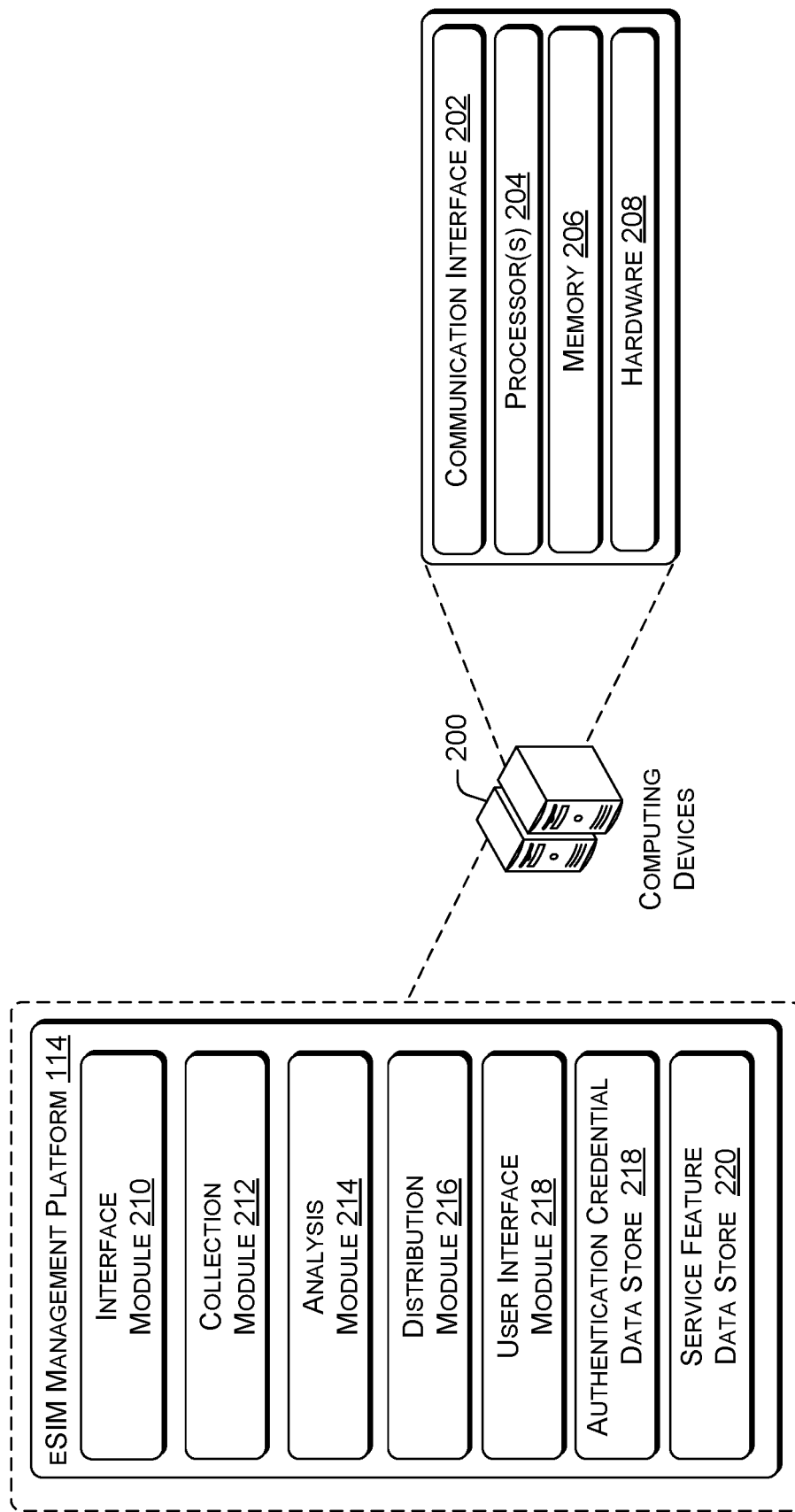
FIG. 2 is a block diagram showing various components of one or more illustrative computing devices that support the eSIM management platform for generating and distributing RSP platform lists.

FIG. 2 is a block diagram showing various components of one or more illustrative computing devices that support the eSIM management platform for generating and distributing RSP platform lists. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 200 or components thereof may be virtual computing devices in the form of virtual machines or software containers that are hosted in a computing cloud.

The computing devices 200 may implement the eSIM management platform 114. The implementation involves the execution of software, applications, and/or modules that include routines, program instructions, code segments, objects, and/or data structures that perform particular tasks or implement particular abstract data types. The eSIM management platform may include an interface module 210, a collection module 212, and a distribution module 216. The interface module 210 may enable the eSIM management platform 114 to communicate with the operational function of the MNO 104. The interface module 210 may further enable the eSIM management platform 114 to communicate with functions of RSP platforms and LPA applications via a standard protocol, such as the hypertext markup language protocol (HTTP). In some instances, the interface module 210 may call one or more APIs of the operational function or the RSP platform to perform operations. Alternatively, or concurrently, the interface module 210 may include one or more APIs that are callable by the operational function, the RSP platforms, and the LPA applications to perform operations. Such operations may include receiving service feature data from RSP platforms and distributing the preferred RSP platform files to the LPA applications on user devices.

In some embodiments, the interface module 210 may include an authentication function that controls access by the RSP platforms and the LPA applications. For example, an interface function of each RSP platform may submit a corresponding authentication credential to the interface module 210 when the RSP platform initially registers with the eSIM management platform 114. For example, the authentication credential may include an RSP identifier and a unique authentication token. The authentication credential of each RSP platform is stored by the eSIM management platform 114 in an authentication credential data store 220. Accordingly, the interface function of an RSP platform may submit an authentication credential in order to interface with the eSIM management platform 114. In turn, the eSIM management platform 114 may validate the submitted authentication credential against the stored authentication credential for the RSP platform to determine whether the RSP platform is to be granted interface access.

Likewise, an LPA application may submit a corresponding authentication credential to the interface module 210 when the LPA application initially registers with the eSIM management platform 114. For example, the authentication credential may include an application identifier and a unique authentication token. The authentication credential of each LPA application is stored by the eSIM management platform 114 in the authentication credential data store 220. Accordingly, the interface function of the LPA application may submit an authentication credential in order to interface with the eSIM management platform 114. In turn, the eSIM management platform 114 may validate the submitted authentication credential against the stored authentication credential for the LPA application to determine whether the LPA application is to be granted interface access. In various embodiments, the computing devices of the eSIM management platform 114, the LPA applications, and the RSP platforms may communicate via a network. The network may include a wireless carrier network, a local area network (LAN), a wide area network (WAN), and/or so forth.

The collection module 212 may store the received service feature data of the RSP platforms in a service feature data store 222. In various embodiments, the service feature data store 222 may include one or more databases, such as relational databases, object databases, object-relational databases, and/or key-value databases that store data. The service feature data for each RSP platform may be stored as related data entries in the one or more databases. Thus, as the interface module 210 receives updated service feature data from an RSP platform, the collection module 212 may update one or more data entries in the databases with the most recent information. In some embodiments, the collection module 212 may periodically activate the interface module 210 to poll servers of the RSP platforms for service feature data. In other embodiments, the servers of the RSP platform may periodically upload the service feature data to the eSIM management platform 114 via the interface module 210.

The analysis module 214 may rank RSP platforms that are specific to different geographical areas based on their service features. For example, the service features of an RSP platform may include a geographical area serviced by the RSP platform, an availability of the RSP platform to distribute eSIM profiles, a representative response time of the RSP platform to requests for eSIM profiles, a reliability of the RSP platform in distributing eSIM profiles, available inventory quantities of eSIM profiles for different user device types that are carried by the RSP platform, and/or so forth.

The availability of the RSP platform may be measured via a ratio of a number of times that the RSP platform responded to eSIM profile requests within a predetermined time limit to a number of times that the RSP platform responded to eSIM profile requests outside of the predetermined time limit. The RSP platform is considered to have responded to an eSIM request when the RSP platform provides an eSIM profile to a user device in response to the request. Such a ratio may be computed for a predetermined time period. The predetermined time period may be an active lifetime of the RSP platform, a periodic time interval (first quarter, second quarter, etc.), or a moving window of time (e.g., the most recent 60 days). The representative response time (e.g., 600 milliseconds) of the RSP platform may be a mean, median, or mode of the response times of the RSP platform in a given time period. The given time period may be an active lifetime of the RSP platform, a periodic time interval (first quarter, second quarter, etc.), or a moving window of time (e.g., the most recent 60 days).

The reliability of the RSP platform may be measured by a percentage of times that the RSP platform responded to eSIM profile requests within a maximum timeout limit during a specific time period. The failure of the RSP platform to respond to the SIM profile request within the maximum timeout limit is considered to be a failure to respond. The specific time period may be an active lifetime of the RSP platform, a periodic time interval (first quarter, second quarter, etc.), or a moving window of time (e.g., the most recent 60 days). In alternative embodiments, the reliability of the RSP platform may be measured by a number of times that the RSP platform responded to eSIM profile requests within a maximum timeout limit during a specific time period. An availability inventory quantity of eSIM profiles for a particular user device type may refer to the number of the eSIM profiles stored by an RSP platform that is available for distribution to user devices. For example, a user device type may be a classification of a user device based on a device model, a device manufacturer, a device operating system, and/or so forth.

In some embodiments, the analysis module 214 may use minimal service feature requirements to determine whether an RSP platform is to be included or excluded from a preferred RSP platform list for a particular geographical area. For example, the minimal service requirements may include a minimum available requirement, a maximum response time requirement, a minimum reliability requirement, a minimum availability inventory quantity requirement, etc. Such requirements may be in the form of ratios, numerical values, percentage values, and/or so forth. Accordingly, an RSP platform that services a geographical area may be included in a preferred RSP platform list for the geographical area when each service feature of the RSP platform meets a corresponding service feature requirement. Otherwise, the RSP platform may be excluded from a preferred RSP platform list.

Furthermore, the analysis module 214 may rank the multiple RSP platforms that are eligible for inclusion in a preferred RSP platform list from the most preferred to the least preferred. In some instances, the analysis module 214 may rank the multiple RSP platform based on one or more service features that are deemed the most important. For example, if RSP platform reliability is the most important, then the multiple RSP platforms may be ranked according to their respective reliability measurements. Further, if RSP platform response time is the next most important, then any RSP platforms that have identical reliability measurements may be ranked based on their response times, and so on and so forth. Thus, a first RSP platform with the shorter response time will be ranked as more preferred than a second RSP platform that has a longer response time. An additional distinction in preference can also be made based on RSP platform availability, in which an RSP platform that is more available is preferred over an RSP platform that is less available. In this way, the analysis module 214 may use the importance of service features to rank each of the multiple RSP platforms in an order of preference.

In other instances, the analysis module 214 may calculate a preference value for each of the multiple RSP platforms that are eligible for inclusion in a preferred RSP platform list. The multiple RSP platforms are then positioned in the preferred RSP platform list according to their preference values. The preference value for an RSP platform may be calculated by first assigning a weighting value to each of the service feature measurements of the RSP platform. In various embodiments, the weighting value assigned to each service feature measurement may be a positive value or a negative value. The product of each service feature value and weighting value pair of the RSP platform is then calculated by the analysis module 214. The products for the service features of the RSP platform are then summed together to generate the preference value for the RSP platform. Subsequently, the analysis module 214 may designate the RSP platform of the multiple RSP platforms with the highest preference value as the most preferred, as well as designate the remaining RSP platforms in order of preference according to their successive lower preference values. In instances where two or more RSP platforms have identical preference values, other characteristics of these RSP platforms, such as a cost to the eSIM management platform 114, a geographical proximity to the eSIM management platform 114, etc. may serve as tie breakers. For example, a lower cost or closer geographical proximity may result in a higher preference ranking.

The distribution module 216 may distribute the preferred RSP platform files, such as the preferred RSP platform file 120, to user devices. Each of the preferred RSP platform files may contain one or more preferred RSP platform lists. In the push-model, the distribution module 216 may send a preferred RSP platform file to a user device on a periodic basis or on the occurrence of certain events. For example, the distribution module 216 may receive a notification from the wireless carrier network of the MNO 104 indicating that the user device 102 has powered on and registered with the wireless carrier network of the MNO 104 or a partner MNO of the MNO 104. Accordingly, the distribution module 216 may send a preferred RSP platform file to the user device 102. In turn, the LPA application 112 on the user device 102 may receive the preferred RSP platform file and store the file in the eSIM 110 or in another memory location of the user device 102. In another example, the distribution module 216 may receive a notification from the wireless carrier network of the MNO 104 indicating that the user device 102 is approaching within a predefined distance of a boundary for a geographical area served by the wireless carrier network of the MNO 104. This may be determined by the user device 102 connecting to a particular base station node of the wireless carrier network that is proximate to the boundary. In response to such a detection, the distribution module 216 may send a preferred RSP platform file to the user device 102.

In the pull-model, the LPA application 112 on the user device 102 may be configured to request an updated version of a preferred RSP platform file from the distribution module 216 on a periodic basis or on the occurrence of certain events. For example, these events may include the user device 102 rebooting, and/or powering on and registering with the wireless carrier network of the MNO 104.

The user interface module 218 may enable an administrator to interact with the eSIM management platform 114 via user interface controls. The user interface controls may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. Accordingly, the administrator may use the user interface module 218 to perform tasks such as viewing the service features of various RSP platforms, inputting one or more service parameters, modifying the various service parameter requirements, and/or so forth.

Example Computing Device Components

Figure 3:
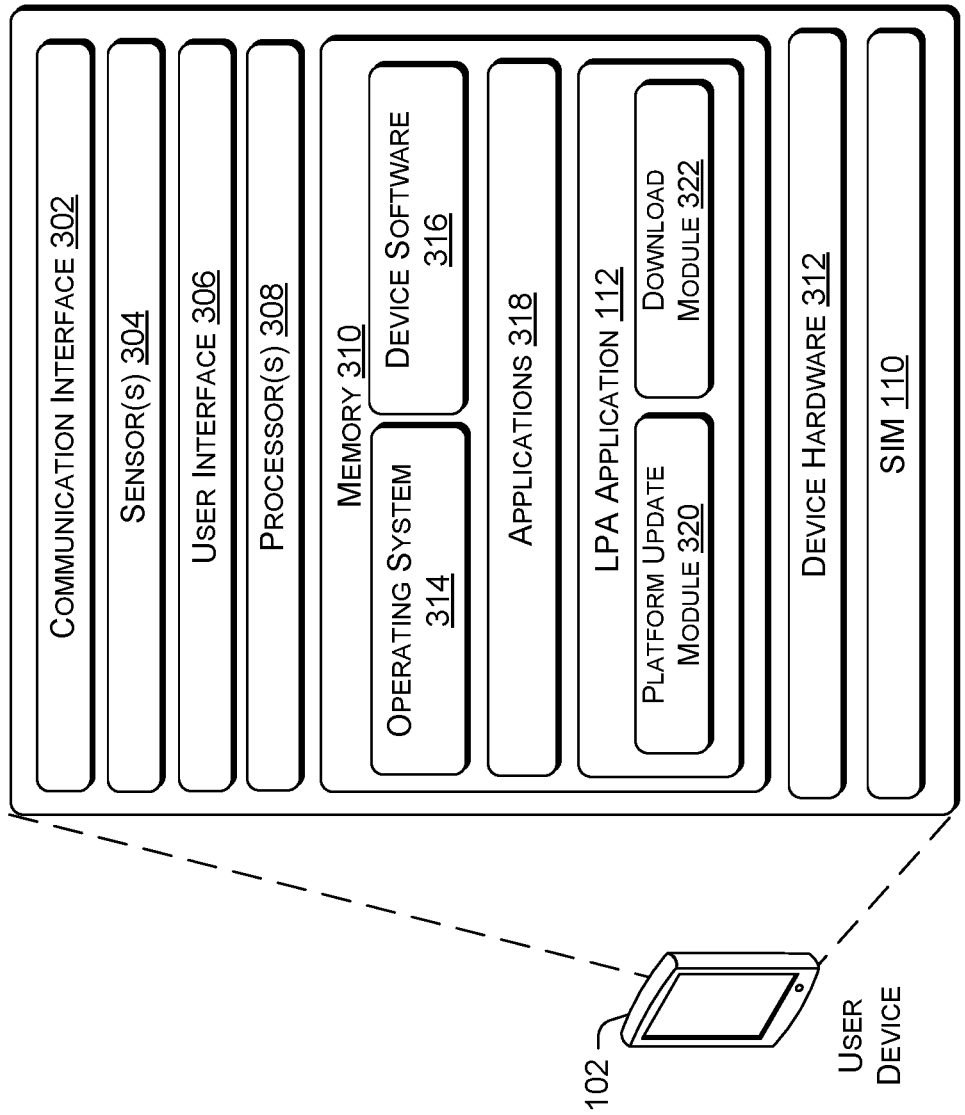
FIG. 3 is a block diagram showing various components of an illustrative user device that executes the LPA application to selectively download a new eSIM profile.

FIG. 3 is a block diagram showing various components of an illustrative user device that executes the LPA application to selectively download the new eSIM profile. The user device 102 may include a communication interface 302, one or more sensors 304, a user interface 306, one or more processors 308, memory 310, and device hardware 312. The communication interface 302 may include wireless and/or wired communication components that enable the electronic device to transmit or receive voice or data communication via the wireless carrier network, as well as other telecommunication and/or data communication networks. The sensors 304 may include a proximity sensor, a compass, an accelerometer, biometric sensors, cameras, and/or a global positioning system (GPS) sensor, among other appropriate sensors. The proximity sensor may detect the movement of objects that are proximate to the user device 102. The compass, the accelerometer, and the GPS sensor may detect orientation, movement, and geolocation of the user device 102. The cameras may capture images of the environment around the user device 102.

The user interface 306 may enable a user to provide input and receive output from the user device 102. The user interface 306 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 310 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 312 may include a cellular modem that enables the user device 102 to perform telecommunication and data communication with one or more wireless carrier networks, as well as a short-range transceiver that enables the device to connect to other devices via short-range wireless communication links. The device hardware 312 may further include signal converters, antennas, hardware decoders and encoders, graphics processors, and/or the like that enable the user device 102 to execute applications and provide telecommunication and data communication functions. The cellular modem may be driven by modem software to perform telecommunication and data communication with a wireless communication network. The modem software may be firmware that is stored in dedicated non-volatile memory of the user device 102. Such non-volatile memory may include read-only memory (ROM), erasable programmable read-only memory (EPROM), or flash memory. The user device is further equipped with the eSIM 110 that stores one or more eSIM profiles.

The one or more processors 308 and the memory 310 of the user device 102 may implement an operating system 314, device software 316, one or more applications 318, and the LPA application 112. Such software may include routines, program instructions, objects, and/or data structures that are executed by the processors 308 to perform particular tasks or implement particular abstract data types.

The operating system 314 may include components that enable the user device 102 to receive and transmit data via various interfaces (e.g., user controls, communication interface 302, and/or memory input/output devices). The operating system 314 may also process data using the one or more processors 308 to generate outputs based on inputs that are received via the user interface 306. For example, the operating system 314 may provide an execution environment for the execution of the applications 318. The operating system 314 may include a presentation component that presents the output (e.g., display the data on an electronic display, store the data in memory, transmit the data to another electronic device, etc.).

The operating system 314 may include an interface layer that enables applications to interface with the modem and/or the communication interface 302. The interface layer may comprise public APIs, private APIs, or a combination of both public APIs and private APIs. Additionally, the operating system 314 may include other components that perform various other functions generally associated with an operating system. The device software 316 may include software components that enable the user device to perform functions. For example, the device software 316 may include basic input/output system (BIOS), bootrom, or a bootloader that boots up the user device 102 and executes the operating system 314 following power-up of the device.

The applications 318 may include applications that provide utility, entertainment, and/or productivity functionalities to a user of the user device 102. For example, the applications 318 may include telephony applications, electronic mail applications, remote desktop applications, web browser applications, navigation applications, office productivity applications, multimedia streaming applications, an online shopping application, and/or so forth.

The LPA application 112 may include a platform update module 320 and a download module 322. Such modules may include routines, program instructions, objects, and/or data structures that are executed by the processors 204 to perform particular tasks or implement particular abstract data types. The LPA application 112 may communicate with one or more computing devices of the Mill platform via a network. The network may include a wireless carrier network, a local area network (LAN), a wide area network (WAN), and/or so forth.

The platform update module 320 may obtain preferred RSP platform files, such as the preferred RSP platform file 120, from an eSIM management platform of the MNO 104 via a pull-model or a push-model. In the pull-model, the platform update module 320 may periodically request an updated version of the preferred RSP platform file 120 from the eSIM management platform for storage in the eSIM 110. In the push-model, the eSIM management platform 114 may periodically send the most updated version of the preferred RSP platform file 120 to the platform update module 320. In turn, the platform update module 320 may store the most updated version in the eSIM 110.

The download module 322 may be configured to send an eSIM profile request to an RSP platform that services a geographical area. In some embodiments, the download module 322 may select the RSP platform based on a preferred RSP platform list for the geographical area. For example, the RSP platform may be the most preferred RSP platform listed in the preferred RSP platform list. In some embodiments, the download module 322 may make the selection when the user device 102 determines via geolocation data that the user device 102 has moved from a first geographical area served by the MNO 104 to a geographical area serviced by a partner MNO of the MNO 104. However, in other embodiments, the download module 322 may initiate the request when the user device 102 initially powers up while located in a geographical area.

The eSIM profile request may include a device identifier of the user device 102, an identifier of the eSIM 110, a network identifier of the MNO 104, i.e., home wireless carrier network, geolocation information of the user device 102, a network identifier of the MNO for which the eSIM profile is being sought, and/or other identification information. In turn, the RSP platform may prepare and send an eSIM profile that is specific for the partner MNO 106 to the user device 102. Further, the RSP platform may activate a billing function of the partner MNO 106, such as an Online Charging System (OCS) or another equivalent core network component, to track the usage of telecommunication services by the user device 102. The tracked usage information is used by the billing function to bill a subscriber account established for the user device 102 or pass through the charges to a subscriber account that is associated with the user device 102 and established with the MNO 104.

The download module 322 may store the eSIM profile into the eSIM 110. The eSIM profile is then used by the user device 102 to access telecommunication services from the partner MNO. In some instances, the storage of the eSIM profile that is specific to partner MNO (e.g., eSIM profile 128) into the eSIM 110 may include a replacement of an existing eSIM profile (e.g., eSIM profile 108 that is specific to the MNO 104) in the eSIM 110. However, in other instances, the eSIM profile that is specific to partner MNO may be stored in the eSIM 110 along with an existing eSIM profile.

In some instances, the download module 322 may be unable to receive a requested eSIM profile that is specific to an MNO from an RSP platform within a predetermined period of time. This may occur due to an error or outage that occurs at the RSP platform. In such instances, the download module 322 may automatically request another eSIM profile that is specific to the MNO from the next most preferred RSP platform, and so on and so forth. Accordingly, the download module 322 may proceed down the preferred RSP platform list in the event of one or more additional eSIM profile download failures until the download module 322 is able to obtain the eSIM profile specific to the MNO from an RSP platform on the list.

In some embodiments, the download module 322 may blacklist an RSP platform that is unable to provide eSIM profiles for a predetermined number of times (e.g., three times). In such embodiments, the RSP platform is deemed to be unable to provide an eSIM profile when the RSP platform is unable to provide the eSIM profile within a pre-established time limit (e.g., 700 milliseconds). In some instances, the download module 322 may perform the blacklisting by removing the RSP platform from the corresponding preferred RSP platform list. In other instances, the download module 322 may perform the blacklisting by placing the RSP platform on an actual blacklist. In the latter instances, the download module 322 may verify that an RSP platform selected to provide an eSIM profile is not on the blacklist before sending an eSIM profile request to the RSP platform. However, if the RSP platform is on the blacklist, the download module 322 may skip the RSP platform and move to the next most preferred RSP platform.

Example Processes

Figure 4:
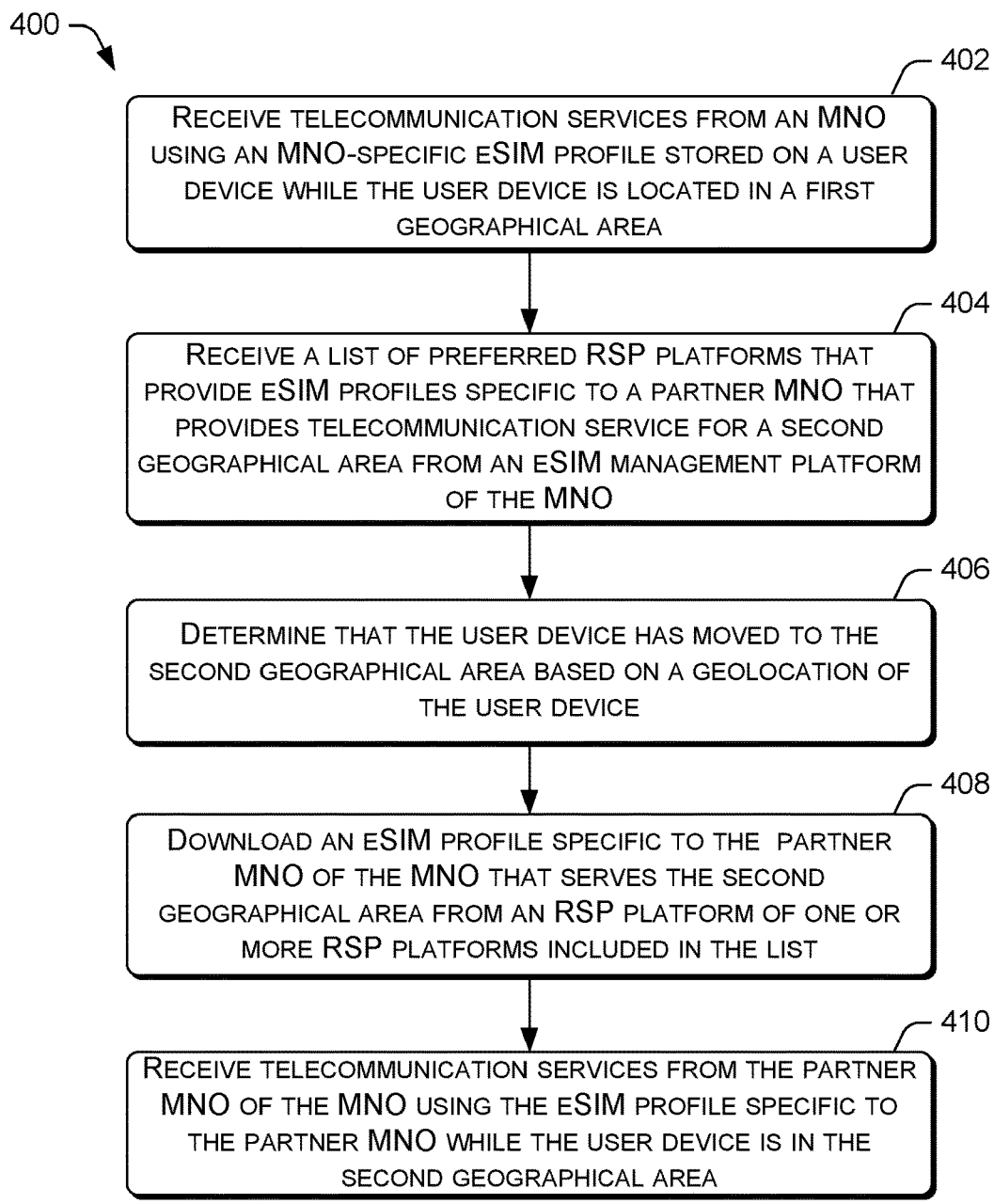
FIG. 4 is a flow diagram of an example process for an LPA application on a user device to obtain a new eSIM profile from an RSP platform that is listed on a preferred RSP platform list provided by the eSIM management platform.
Figure 5:
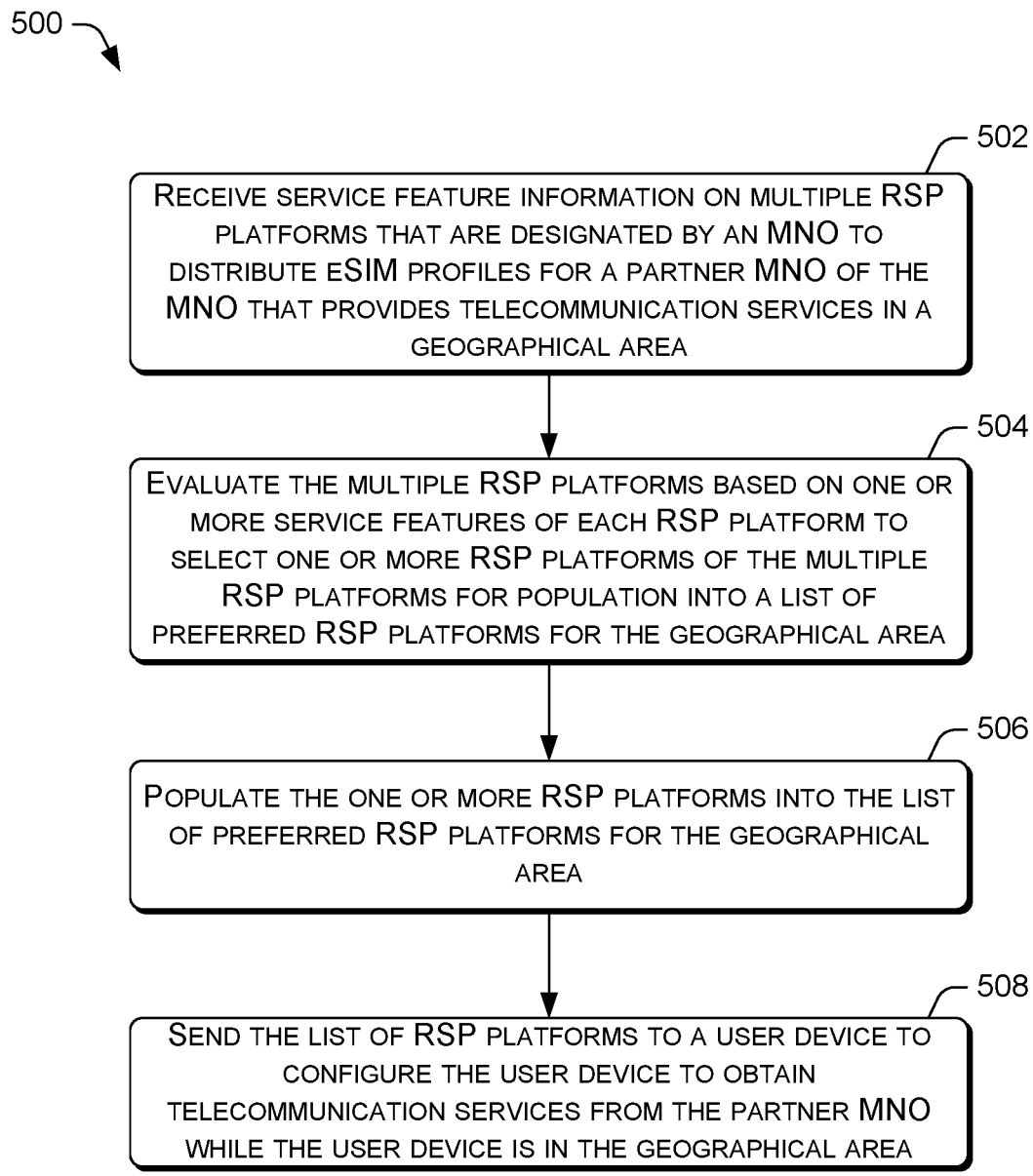
FIG. 5 is a flow diagram of an example process for an eSIM management platform to send an RSP platform list of available RSP platforms to an LPA application on a user device.
Figure 6:
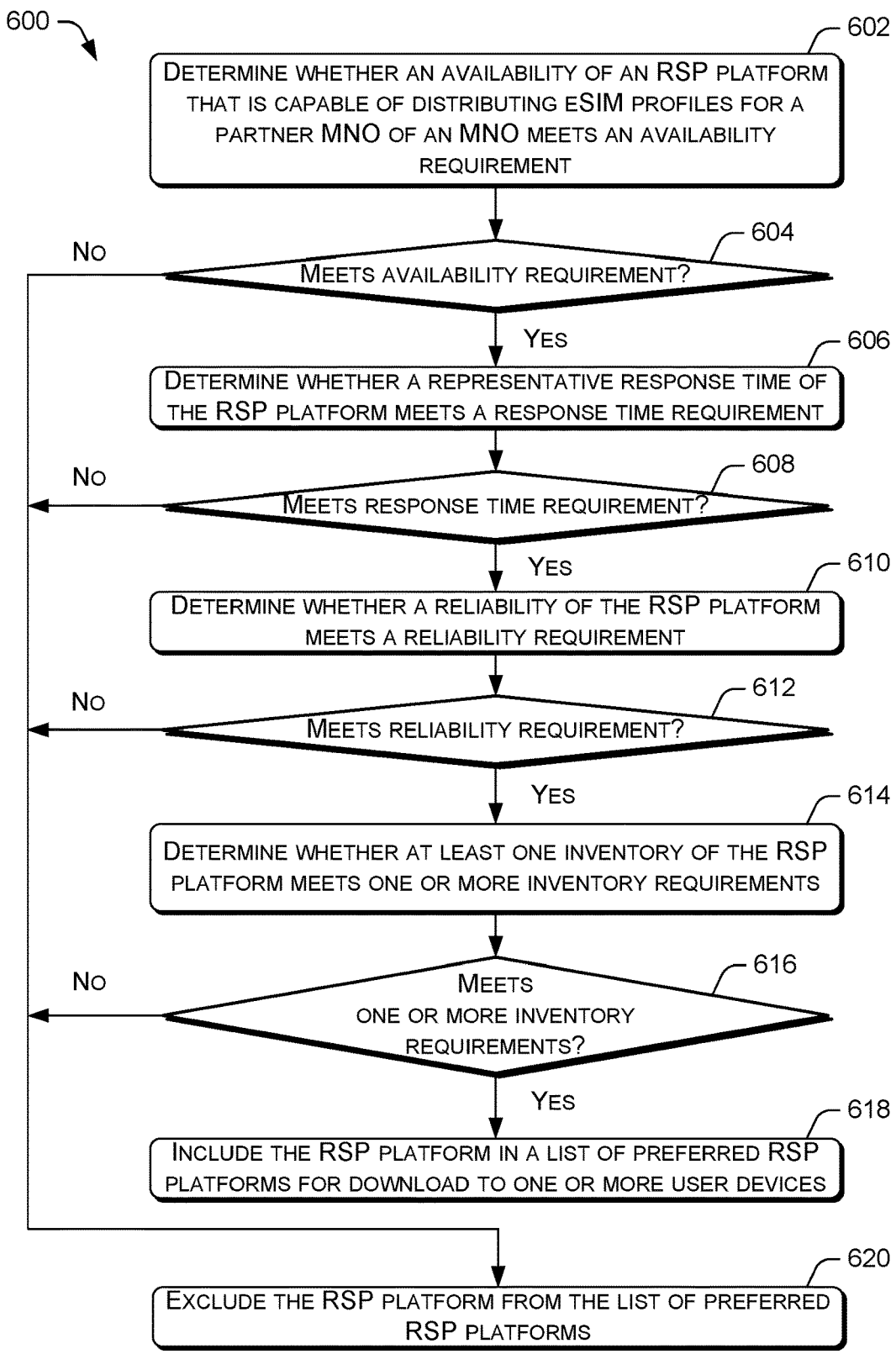
FIG. 6 is a flow diagram of an example process for an eSIM management platform to determine whether an RSP platform is to be included in an RSP platform list.

FIGS. 4-6 present illustrative processes 400-600 for an LPA application on a user device to selectively download a new eSIM profile from a particular RSP platform based on a preferred RSP platform list provided by an eSIM management platform. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an example process 400 for an LPA application on a user device to obtain the new eSIM profile from a preferred RSP platform that is listed on an RSP platform list provided by the eSIM management platform. At block 402, the user device 102 may receive telecommunication services from an MNO using an MNO-specific eSIM stored on a user device while the user device is located in a first geographical area. In various embodiments, the MNO may be the MNO 104 that operates a home wireless carrier network of the user device 102 or a partner MNO of the MNO 104.

At block 404, the LPA application 112 on the user device 102 may receive a list of preferred RSP platforms that distribute eSIM profiles specific to a partner MNO that provides telecommunication services for a second geographical area from an eSIM management platform 114 of the MNO 104. This partner MNO is different from the partner MNO described in block 402. In various embodiments, the list may be organized in an order of preference, e.g., from a most preferred RSP platform to a least preferred RSP platform.

At block 406, the LPA application 112 may determine that the user device has moved to the second geographical area based on a geolocation of the user device. In various embodiments, the LPA application 112 may make this determination based on geolocation data detected by a GPS sensor of the user device 102.

At block 408, the LPA application 112 may download an eSIM profile for the partner MNO of the MNO that serves the second geographical area from an RSP platform of one or more RSP platforms included in the list. The download may include the LPA application 112 requesting the eSIM profile from a most preferred RSP platform in the list. In turn, the most preferred RSP platform may send the eSIM profile to the user device 102. The downloaded eSIM profile may be stored by the LPA application 112 in the eSIM 110 of the user device 102. In some instances, the storage of the downloaded eSIM profile of the partner MNO may include replacing an existing eSIM profile stored in the eSIM 110 with the eSIM profile of the partner MNO. However, in other instances, the downloaded eSIM profile of the partner MNO may be stored along with the existing eSIM profile in the eSIM 110.

In instances in which the most preferred RSP platform is unable to provide the eSIM profile, the LPA application may automatically request another eSIM profile that is specific to the MNO from the next most preferred RSP platform, and so on and so forth. Accordingly, the LPA application 112 may proceed down the preferred RSP platform list in the event of one or more additional eSIM profile download failures until the LPA application 112 is able to obtain the eSIM profile specific to the MNO from an RSP platform on the list.

At block 410, the user device 102 may access telecommunication service in the second geographical area from the partner MNO of the MNO using the eSIM profile specific to the partner MNO. The user device 102 is able to access a wireless carrier network of the partner MNO using the eSIM profile specific to the partner MNO.

FIG. 5 is a flow diagram of an example process 500 for an eSIM management platform to send a preferred RSP platform list of available RSP platforms to an LPA application on a user device. At block 502, the eSIM management platform 114 may receive service feature information on multiple RSP platforms that are designated by the MNO 104 to distribute eSIM profile for a partner MNO that provides telecommunication services in a geographical area. At block 504, the eSIM management platform 114 may evaluate the multiple RSP platforms based on one or more service features of each RSP platform to select one or more RSP platforms of the multiple RSP platforms for population into a list of preferred RSP platforms for the geographical area. The service features of an RSP platform may include a geographical area serviced by the RSP platform, an availability of the RSP platform to distribute eSIM profiles, a representative (e.g., average) response time of the RSP platform to requests for eSIM profiles, a reliability of the RSP platform in distributing eSIM profiles, available inventory quantities of eSIM profiles for different user device types that are carried by the RSP platform, and/or so forth.

At block 506, the eSIM management platform 114 may populate the one or more RSP platforms into the list of preferred RSP platforms for the geographical area. At block 508, the eSIM management platform may send the list of RSP platforms to a user device to configure the user device obtain telecommunication services from the partner MNO while the user device is in the geographical area.

FIG. 6 is a flow diagram of an example process 600 for an eSIM management platform to determine whether an RSP platform is to be included in a preferred RSP platform list. The example process 600 may further describe block 504 of the example process 500. At block 602, the eSIM management platform 114 may determine whether an availability of an RSP platform that is capable of distributing eSIM profiles for a partner MNO of the MNO 104 meets an availability requirement. At decision block 604, if the RSP platform is determined to meet the availability requirement, the process 600 may continue to block 606. At block 606, the eSIM management platform 114 may determine whether a representative response time of the RSP platform meets a response time requirement. At decision block 608, if the RSP platform is determined to meet the response time requirement, the process 600 may continue to block 610.

At block 610, the eSIM management platform 114 may determine whether a reliability of the RSP platform meets a reliability requirement. At decision block 612, if the RSP platform is determined to meet the reliability requirement, the process 600 may proceed to block 614. At block 614, the eSIM management platform 114 may determine whether at least one inventory of the RSP platform meets one or more inventory requirements. At decision block 616, if the at least one inventory of the RSP platform meets one or more inventory requirements, the process 600 may proceed to block 618. At block 618, the eSIM management platform 114 may include the RSP platform in a list of preferred RSP platforms for download to one or more user devices. In some instances, the RSP platform may be placed in the list in preference order according to one or more of its service feature measurements. In other instances, the RSP platform may be placed in the list in preference order with respect to one or more other RSP platforms according to its preference value.

Returning to decision block 604, if the eSIM management platform 114 determines that the availability of the RSP platform does not meet the availability requirement, the process 600 may proceed to block 620. At block 620, the eSIM management platform 114 may exclude the RSP platform from the list of the preferred RSP platforms. Returning to decision block 608, if the eSIM management platform 114 determines that the representative response time of the RSP platform does not meet the response time requirement, the process 600 may also proceed to block 620. Returning to decision block 612, if the eSIM management platform 114 determines that the reliability of the RSP platform does not meet the reliability requirement, the process 600 may also proceed to block 620. Returning to decision block 616, if the eSIM management platform 114 determines that at least one inventory of the RSP platform does not meet one or more inventory requirements, the process 600 may also proceed to block 620.

The distribution of lists of available RSP platforms for different geographical areas to a user device enables the LPA application on the user device to directly request an eSIM profile from an RSP platform as the user device travels to a new geographical area. The use of an eSIM profile for a partner MNO in the new geographical area may allow the user device to avoid accruing out-of-network roaming fees for using the telecommunication services provided by the partner MNO. In some instances, the use of such an eSIM profile by the user device may also enable the user device to receive higher quality services and/or additional service features from the partner MNO.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a user device storing computer-executable instructions that upon execution cause one or more processors to perform acts comprising: receiving telecommunication services using an embedded subscriber identity module (eSIM) profile stored on the user device while the user device is located in a first geographical area; receiving a list of preferred remote SIM provisioning (RSP) platforms that provide eSIM profiles specific to a partner mobile network operator (MNO) of an MNO in a second geographical area from an eSIM management platform of the MNO; determining the user device has moved to a second geographical area based on a geolocation of the user device; and downloading an additional eSIM profile specific to the partner MNO of the MNO from an RSP platform of one or more RSP platforms included in the list of preferred RSP platforms.

2. The one or more non-transitory computer-readable media of claim 1, wherein the acts further comprise receiving telecommunication services from the partner MNO using the additional eSIM profile specific to the partner MNO in the second geographical area.

3. The one or more non-transitory computer-readable media of claim 1, wherein the receiving telecommunication services in the first geographical area includes receiving the telecommunication services from the MNO or a partner MNO of the MNO via the eSIM profile.

4. The one or more non-transitory computer-readable media of claim 1, wherein the RSP platform is a most preferred RSP platform in the list of preferred RSP platforms.

5. The one or more non-transitory computer-readable media of claim 1, wherein the RSP platform is selected to provide the additional eSIM profile to the user device following an indication that a more preferred RSP platform on the list of is unable to provide the additional eSIM profile to the user device.

6. The one or more non-transitory computer-readable media of claim 1, wherein the list of preferred RSP platforms ranks multiple RSP platforms from a most preferred RSP platform to a least preferred RSP platform based on one or more service features of the multiple RSP platforms.

7. The one or more non-transitory computer-readable media of claim 6, wherein at least one service feature of the RSP platform include a geographical area serviced by the RSP platform, an availability of the RSP platform to distribute eSIM profiles, a representative response time of the RSP platform to requests for the eSIM profiles, a reliability of the RSP platform in distributing the eSIM profiles, at least one available inventory quantity of eSIM profiles that are carried by the RSP platform for one or more user device types.

8. A computer-implemented method, comprising: receiving, at a user device, telecommunication services using an embedded subscriber identity module (eSIM) profile stored on the user device while the user device is located in a first geographical area; receiving, at the user device, a list of preferred remote SIM provisioning (RSP) platforms that provide eSIM profiles specific to a partner mobile network operator (MNO) of an MNO in a second geographical area from an eSIM management platform of the MNO; determining the user device has moved to a second geographical area based on a geolocation of the user device; and downloading, at the user device, an additional eSIM profile specific to the partner MNO of the MNO from an RSP platform of one or more RSP platforms included in the list of preferred RSP platforms.

9. The computer-implemented method of claim 8, further comprising receiving telecommunication services from the partner MNO using the additional eSIM profile specific to the partner MNO in the second geographical area.

10. The computer-implemented method of claim 8, wherein the receiving telecommunication services in the first geographical area includes receiving the telecommunication services from the MNO or a partner MNO of the MNO via the eSIM profile.

11. The computer-implemented method of claim 8, wherein the RSP platform is a most preferred RSP platform in the list of preferred RSP platforms.

12. The computer-implemented method of claim 8, wherein the RSP platform is selected to provide the additional eSIM profile to the user device following an indication that a more preferred RSP platform on the list of is unable to provide the additional eSIM profile to the user device.

13. The computer-implemented method of claim 8, wherein the list of preferred RSP platforms ranks multiple RSP platforms from a most preferred RSP platform to a least preferred RSP platform based on one or more service features of the multiple RSP platforms.

14. The computer-implemented method of claim 13, wherein at least one service feature of the RSP platform include a geographical area serviced by the RSP platform, an availability of the RSP platform to distribute eSIM profiles, a representative response time of the RSP platform to requests for the eSIM profiles, a reliability of the RSP platform in distributing the eSIM profiles, at least one available inventory quantity of eSIM profiles that are carried by the RSP platform for one or more user device types.

15. A user device, comprising: one or more processors; and memory including a plurality of computer-executable components that are executable by the one or more processors to perform a plurality of actions, the plurality of actions comprising: receiving telecommunication services using an embedded subscriber identity module (eSIM) profile stored on the user device while the user device is located in a first geographical area; receiving a list of preferred remote SIM provisioning (RSP) platforms that provide eSIM profiles specific to a partner mobile network operator (MNO) of an MNO in a second geographical area from an eSIM management platform of the MNO; determining the user device has moved to a second geographical area based on a geolocation of the user device; and downloading an additional eSIM profile specific to the partner MNO of the MNO from an RSP platform of one or more RSP platforms included in the list of preferred RSP platforms.

16. The user device of claim 15, wherein the plurality of actions further comprise receiving telecommunication services from the partner MNO using the additional eSIM profile specific to the partner MNO in the second geographical area.

17. The user device of claim 15, wherein the receiving telecommunication services in the first geographical area includes receiving the telecommunication services from the MNO or a partner MNO of the MNO via the eSIM profile.

18. The user device of claim 15, wherein the RSP platform is a most preferred RSP platform in the list of preferred RSP platforms.

19. The user device of claim 15, wherein the list of preferred RSP platforms ranks multiple RSP platforms from a most preferred RSP platform to a least preferred RSP platform based on one or more service features of the multiple RSP platforms.

20. The user device of claim 19, wherein at least one service feature of the RSP platform include a geographical area serviced by the RSP platform, an availability of the RSP platform to distribute eSIM profiles, a representative response time of the RSP platform to requests for the eSIM profiles, a reliability of the RSP platform in distributing the eSIM profiles, at least one available inventory quantity of eSIM profiles that are carried by the RSP platform for one or more user device types.

\* \* \* \* \*